Oct. 22, 1957   M. W. SHIPPEY   2,810,251
ROTARY DISC MOWER WITH ADJUSTABLE MOTOR-CUTTER UNIT
Filed July 8, 1955
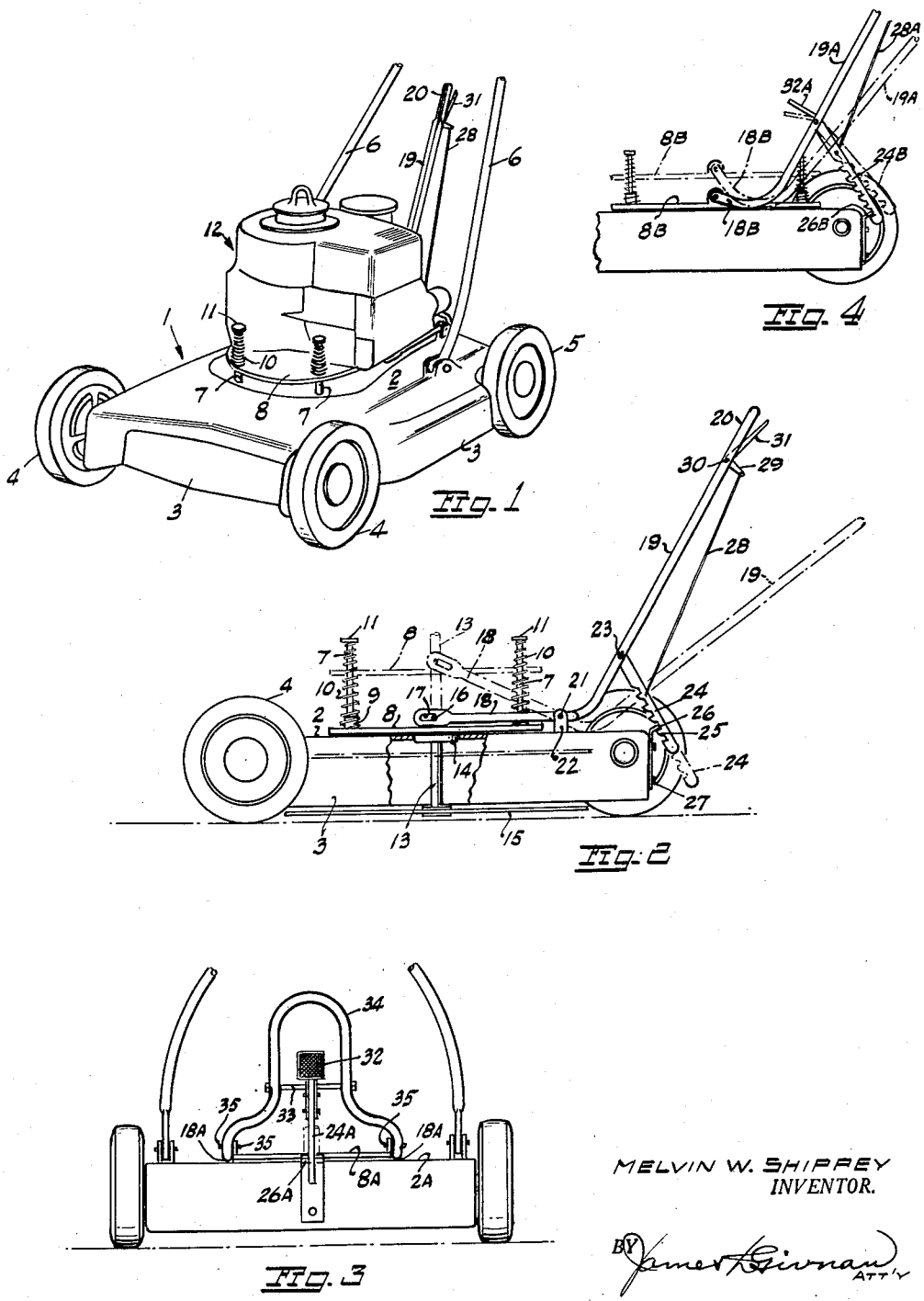
MELVIN W. SHIPPEY
INVENTOR.
BY James L. Givnan
ATT'Y

2,810,251
ROTARY DISC MOWER WITH ADJUSTABLE MOTOR-CUTTER UNIT

Melvin W. Shippey, Salem, Oreg.

Application July 8, 1955, Serial No. 520,650

2 Claims. (Cl. 56—25.4)

This invention relates to improvements in power mowers of the type embodying a four-wheel supported horizontal body having a vertical shaft extending downwardly therethrough and directly driven by an engine or motor mounted upon the body and a rotary blade or cutter head secured to the bottom end of the shaft.

One of the principal objects of the invention is to provide means for vertically adjusting the engine and cutter blade as a unit to raise or lower the same and to automatically lock them in any adjusted position.

A further object is to provide adjusting means as aforesaid remotely disposed from the engine-cutter blade unit and capable of operation by the hand and/or foot of the operator in an accurate and expeditious manner to position the cutter blade at any desired distance above the ground.

The foregoing and other objects will appear as my invention is more fully hereinafter described in the following specification, illustrated in the accompanying drawings, and finally pointed out in the appended claims.

In the accompanying drawing:

Figure 1 is a perspective view of a power mower provided with vertical adjusting means made in accordance with my invention.

Figure 2 is a side view of Figure 1 with the engine and handle removed and a fragment of the body torn away for convenience of illustration.

Figure 3 is a rear view of foot-operated vertical adjusting means.

Figure 4 is a fragmentary side view of a modified form of the invention and embodying combined hand and foot-operated vertical adjusting means.

Referring now more particularly to the drawings:

In Figures 1 and 2 reference numeral 1 indicates, generally, the body of the mower having a top wall indicated at 2 and a continuous depending apron 3. The body is supported by front and rear wheels 4 and 5, respectively, rotatably attached to the side apron portions in any approved manner. Any suitable type of handle 6 is provided for maneuvering the mower.

To the top wall 2 of the body of the mower I secure four corner posts in the form of vertical shafts 7 extending upwardly through an engine bed in the form of a plate 8 and through stabilizing slide bearings 9 carried by the plate. A compression spring 10 surrounds each corner post and bears against the plate and against a head 11 at the top end of each post.

In Figure 1 I have shown an internal combustion engine 12 bolted or otherwise secured to its bed plate 8 and provided with a vertical drive shaft 13 (Figure 2) extending downwardly through the bed plate, through a bearing 14 secured to the top wall 2 of the body 1. The bottom end of the shaft is provided with a horizontally disposed cutter head 15. It will be readily understood that an electric motor with a vertically depending drive shaft may be used instead of the engine shown if desired.

At opposite sides of the bed plate 8 I provide a pair of pins 16 slidably engaged with the slotted ends 17 of a pair of arms 18 which converge rearwardly and extend upwardly to form a hand lever 19 terminating in a hand-grip 20. The arms are pivotally attached to the top of the body of the mower by means of pins 21 extending through brackets 22. Near the bottom end of the lever 19 I pivotally attach as at 23 a bar 24 having teeth 25 formed along its bottom edge for selective engagement, in accordance with the downward movement of the handle 19 from the full to broken line position shown, with a detent 26 secured as at 27 to the rear apron of the body of the mower. The bar 24 is connected by a rod 28 to one arm 29 of a bellcrank pivotally attached as at 30 to the handle 19. The other arm 31 of the bellcrank is in position to be moved toward the hand-grip 20 when gripped by the operator to thus disengage the bar 24 from the detent 26.

From the foregoing it will be apparent that downward movement of the lever 19 and upward movement of the arms 18 about the fulcrum established by the pivot pins 21 will correspondingly raise the engine and cutter blade perpendicular to the surface engaged by the supporting wheels 4 and 5 to vary the depth of the cut. The vertically adjusted position is maintained by the engagement of the teeth of the locking bar 24 with the detent as aforesaid. Disengagement of the locking bar will, of course, allow the engine and cutter blade to return by gravity to the lowermost position shown in full lines in Figure 2. The springs 10 on the corner posts are under compression at all times and thus stabilize the engine bed 8 in any adjusted position as aforesaid.

In the form of the invention shown in Figure 3 I dispense with the hand lever 19 and instead provide the toothed bar 24A with a foot pedal 32 which when depressed will disengage the bar 24A from the detent 26A. The bar 24A is pivotally attached at at 33 to an upwardly extending frame 34 whose leg portions diverge forwardly into forwardly curved arms 18A whose forward ends are pivotally attached to the engine bed plate 8A as at 35 and whose rear ends are at all times in contact with the top 2A of the body of the mower to thereby establish a sliding fulcrum instead of a fixed one as at 21 in Figure 2 for raising the engine and cutter blade as the frame is moved downwardly either by hand or by foot pressure applied to the pedal 32.

In the further modification shown in Figure 4 the forwardly curved arms 18B are also in contact with the top of the mower body to provide a sliding fulcrum. The forward ends of the arms connect with the engine bed plate 8B as shown and converge rearwardly and extend upwardly into a hand lever 19A provided with a toothed bar 24B for selective engagement with a detent 26B as in the other forms of the invention. The bar is provided with a foot pedal 32A and pull rod 28A as shown. In this form of the invention hand and foot pressure can be applied simultaneously to the lever 19A for raising the engine and cutter blade.

From the foregoing it will be seen that the invention provides a simple, efficient and effective device for cutting grass, weeds, and the like which is easy to manipulate and wherein the cutter blade can be quickly and conveniently adjusted from a remote point without stopping the engine or motor which drives the cutter blade.

While I have shown a particular form of embodiment of my invention I am aware that many minor changes therein will readily suggest themselves to others skilled in the art without departing from the spirit and scope of the invention. Having thus described my invention what I claim as new and desire to protect by Letters Patent is:

1. A power mower comprising a wheel supported horizontal body having a top wall, an engine bed plate slidably mounted on said top wall for vertical movement with respect thereto, an engine mounted on the bed plate and having a vertical drive shaft extending downwardly therethrough and through said top wall of the body, a cutter blade secured to the bottom end of said drive shaft for rotation therewith, a pair of arms pivotally and slidably attached at their forward ends to opposite sides of the engine bed plate and converging rearwardly into slidable contact with said top wall and extending upwardly into a frame whereby downward rearward movement of the frame will raise said engine bed plate, engine and cutter blade, a locking bar pivotally attached to said frame and extending downwardly and rearwardly therefrom and selectively engageable with a detent carried by said body for locking said frame in any adjusted position, said locking bar having a foot pedal at its top end whereby foot pressure applied thereto preparatory to lowering the frame will disengage the locking bar from the detent.

2. A power mower as claimed in claim 1 including means carried by said engine bed plate for biasing the same downwardly to thereby through the medium of said frame maintain tension on said locking bar to prevent its unintentional disengagement from said detent.

References Cited in the file of this patent
UNITED STATES PATENTS

| | | |
|---|---|---|
| 1,805,927 | Sharp | May 19, 1931 |
| 2,730,374 | Rogers et al. | Jan. 10, 1956 |